Nov. 16, 1948.  A. W. BRAUN  2,454,130
ADJUSTABLE WHEEL STRUCTURE
Filed Aug. 5, 1947  3 Sheets-Sheet 1

Inventor
Armond W. Braun
By *Clarence A. O'Brien and Harvey B. Jackson*
Attorneys Nov. 16, 1948.  A. W. BRAUN  2,454,130
ADJUSTABLE WHEEL STRUCTURE
Filed Aug. 5, 1947  3 Sheets-Sheet 2
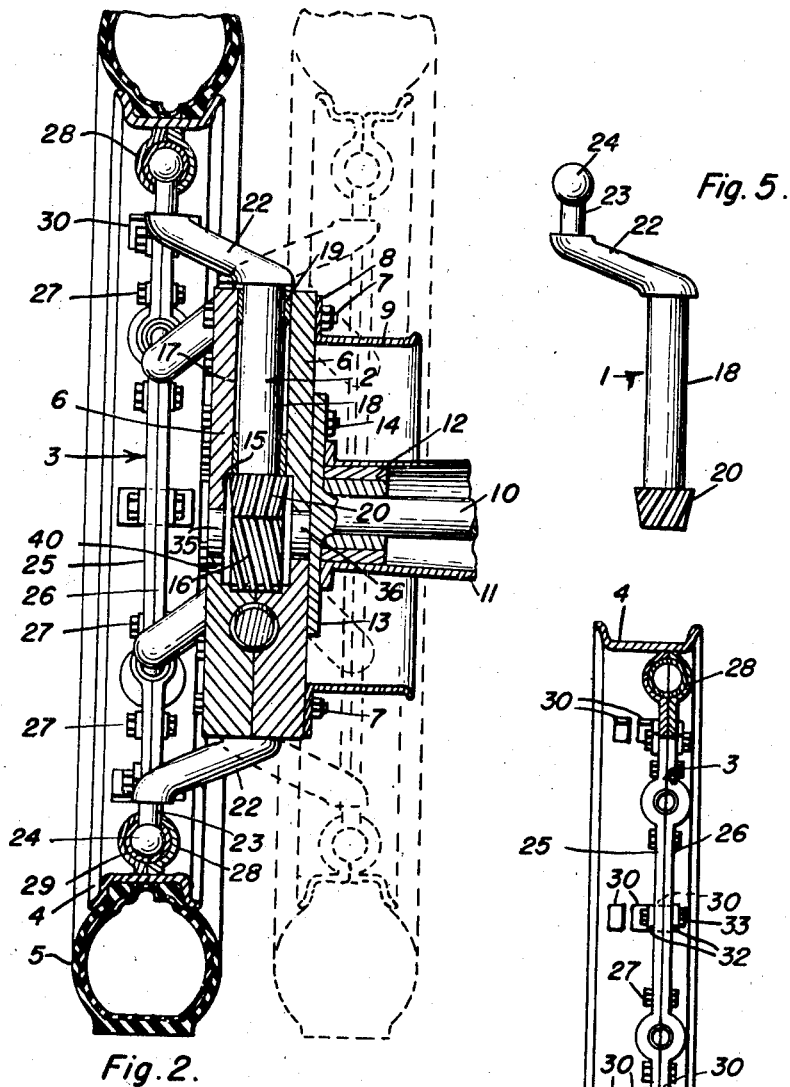
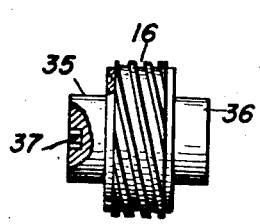
Inventor
Armond W. Braun Nov. 16, 1948.  A. W. BRAUN  2,454,130
ADJUSTABLE WHEEL STRUCTURE
Filed Aug. 5, 1947  3 Sheets-Sheet 3
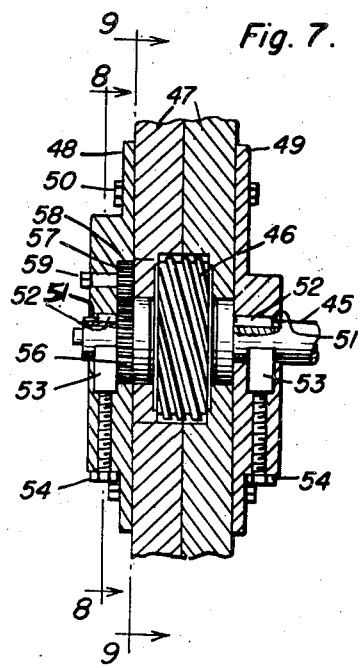
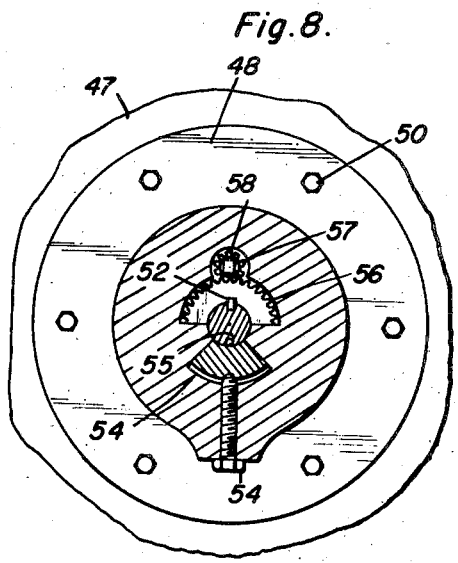
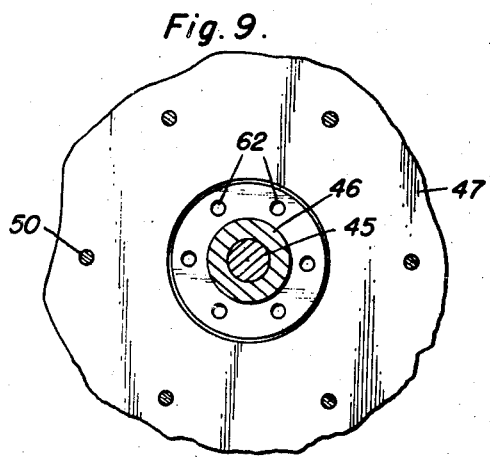
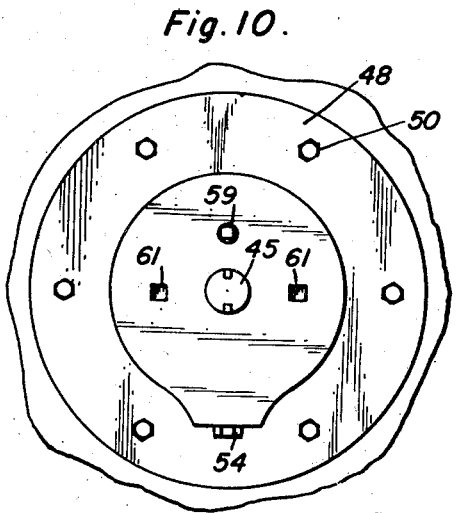
Inventor
Armond W. Braun
By *Clarence A. O'Brien and Harvey B. Jackson*
Attorneys Patented Nov. 16, 1948

2,454,130

UNITED STATES PATENT OFFICE 2,454,130

ADJUSTABLE WHEEL STRUCTURE

Armond W. Braun, Grafton, Iowa

Application August 5, 1947, Serial No. 766,337

7 Claims. (Cl. 301—5)

1

My invention relates to improvements in adjustable wheel structures for use especially, although not necessarily, on tractors.

The primary object of my invention is to provide a simply constructed, practical tractor wheel with means for quickly and accurately adjusting the tread laterally of the hub so as to vary the tread gauge between a pair of such wheels while mounted on axles of the same length.

Another object is to provide for easily and quickly setting the tread into adjusted position.

Still another object is to provide a wheel of the character and for the purpose above set forth which is not liable to get out of order and is comparatively inexpensive to manufacture and use.

Other and subordinate objects, also comprehended by my invention, together with the precise nature of my improvements, and the advantages thereof will be readily understood when the succeeding description and claims are read with reference to the drawings accompanying and forming part of this specification.

In said drawings:

Figure 2 is a view in vertical section taken on the irregular line 2—2 of Figure 1 and showing in broken lines the manner in which the tread of the wheel is adjusted, in one adjustment thereof;

Figure 3 is a view in vertical section of the felly and rim drawn to a smaller scale and illustrating the rim shifted laterally on the felly;

Figure 4 is a view in front elevation partly in section of the master worm wheel;

Figure 5 is a view in side elevation of one of the spokes;

Figure 7 is a fragmentary view in vertical section of a modified embodiment of hub for the wheel;

Figure 8 is a view in vertical section taken on the line 8—8 in Figure 7;

Figure 9 is a similar view taken on the line 9—9 in Figure 7; and,

Figure 10 is a view in side elevation of the modified embodiment of hub.

Figures 1, 6:
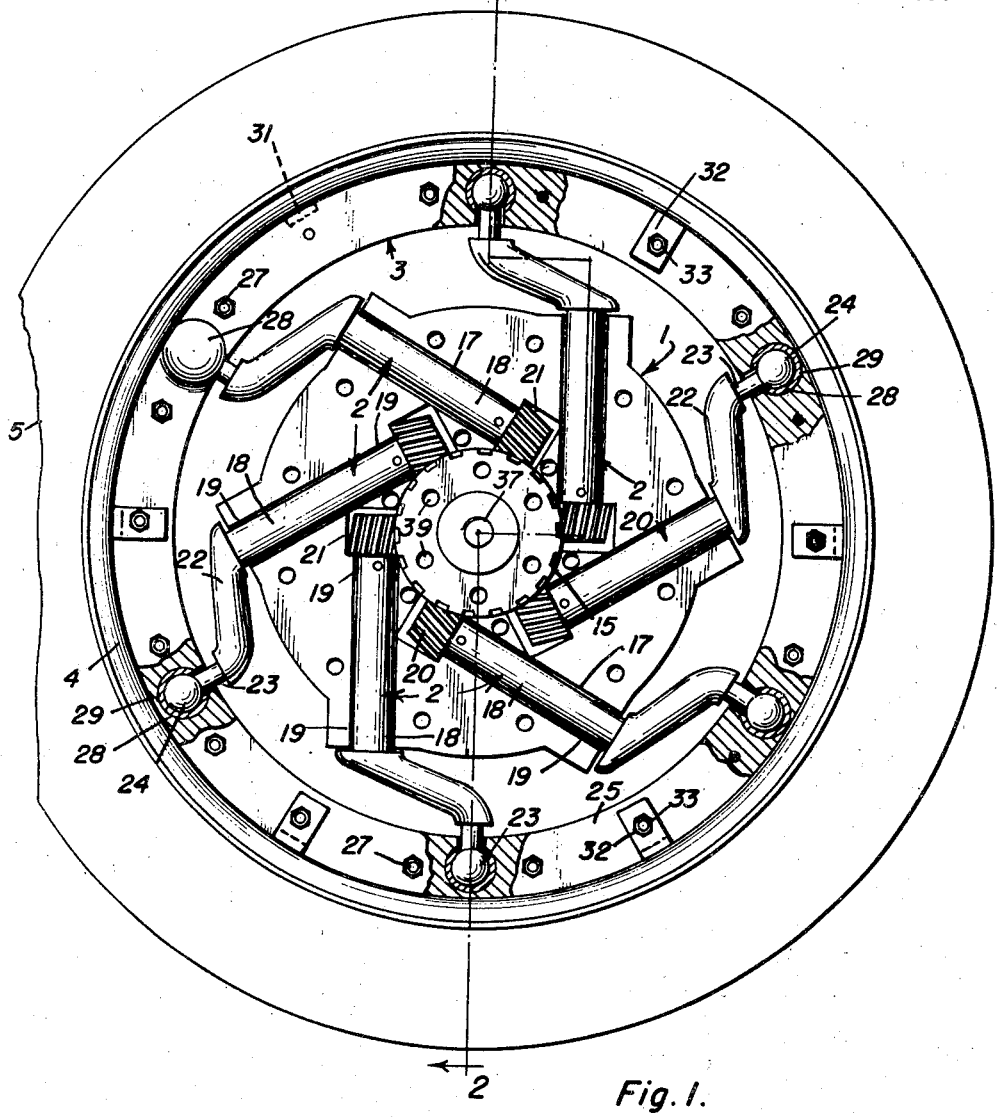
Figure 1 is a view in side elevation, partly broken away and shown in section, of a preferred embodiment of my improved wheel structure with the outer hub section removed to show the parts within the hub.
Figure 6 is a view in plan, partly in section, of the wrench.

Referring now to the drawings by numerals, and first to Figures 1 to 6 thereof, according to my invention in the preferred embodiment thereof, a traction wheel for a tractor, not shown, is provided comprising a hub 1, spokes 2, a felly 3 and a tire retaining rim 4 all constructed and arranged for lateral shifting of the felly 2 and rim 4 relative to the hub 1 to correspondingly shift the tread of a pneumatic tire 5 carried by said rim 4.

The hub 1 comprises a pair of disk-like hub sections 6 bolted together, side by side, by bolts 7 by means of which said sections are secured concentrically to the flange 8 of the usual brake drum 9 of the tractor. The hub 1 is fixed in driven relation to the usual axle section 10 extending out of the axle housing 11 through a bearing 12 and having a circular end flange 13 thereon to which said hub 1 is secured by bolts 14. The hub sections 6 are recessed, as at 15, in the axis thereof to house therein coaxially therewith a master worm wheel 16 presently described, and also recessed in the confronting sides thereof to provide a plurality of bores 17 extending tangentially from the recess 15 to the rim of said hub, and grouped around said hub, co-planar therewith, in equi distantly spaced relation, said bores 17 serving a purpose presently seen.

The spokes 2 have the forms of shafts 18 journaled in bearings 19 in said bores 17 with a worm gear pinion 20 fastened on the inner ends thereof rotatable in enlarged sockets 21 at the inner end of said bores 17 communicating with the recess 15. Outer end cranks 22 extend between the hub 1 and felly 3 from the shafts 18 with reduced outer ends 23 terminating in ball members 24.

The felly 3 comprises a pair of annular metal sections 25, 26 bolted together, side by side, as at 27, and formed with bulging spherical sockets 28 with bearing liners 29 therein and into which the reduced ends 23 of the cranks 22 extend with the ball members 24 rotatably fitted in said liners 29.

The rim 4 is of the usual form for a pneumatic tire but is detachably secured on the felly 3 for lateral shifting thereon through the following means. Series of flat key lugs 30 are provided on the inner circumferential face of the rim 4, the series being equi-distantly spaced apart around said face and there being, preferably, three lugs 30 in each series, the lugs in each series being equi-distantly spaced apart laterally across said rim with the center lug in each series in the circumferential center of said rim. External, transverse slots 31 are provided in the felly 3 to accommodate the series of lugs 30 and permit the rim 4 to be fitted sidewise over said felly. Clamping lugs 32 are secured in pairs to opposite sides of the felly 3 by bolts 33, opposite slots 31, to be selectively clamped by said bolts to opposite sides of corresponding lugs 30 of the series whereby the rim 4 and tire 5 may be shifted laterally of the felly 3 into different adjusted positions, in a manner which will be clear.

The master worm wheel 16 is provided in the recess 15 to mesh with the worm gear pinions 20 and is provided with front and rear side hub sections 35, 36 journaled in said recess 15 in the axis of the hub 1 with the front hub section 35 exposed at the outboard side of the wheel and provided with an axial square socket 37 for receiving a spud wrench 38, such as shown in Figure 6, whereby the master worm wheel 34 may be rotatably adjusted by said wrench as occasion may require. A circular series of equi-distantly spaced sockets 39 is provided in the face of the front hub section 35 to be aligned selectively with a pair of diametrically opposite apertures 40 in the hub section 6 on the outboard side of the wheel to gauge adjustment of said master worm wheel 16 in equi-distant steps of rotation, one of said apertures 40 being shown in Figure 2. The spud wrench 38 is provided with a pilot point 41 for insertion through said apertures 40 into the sockets 39 to facilitate aligning said sockets with said apertures.

As will be clear, the spokes 2 are arranged in the hub 1 so that the cranks 18 may be revolved in the same direction out of the plane of the hub 1 under rotary adjustment of the master worm wheel 16 to thereby adjust the felly 3, rim 4 and tire 5 laterally of the hub 1 in relatively opposite directions, the sockets 28 and ball members 24 providing universal joint connections between said felly 3 and the spokes 2 permitting rotation of said felly and side movement thereof relative to the hub 1 compensating for the throw of said cranks 22. Rotary adjustment of the master worm wheel 16 may be accomplished through the spud wrench 38, in the manner described, with the axle housing 11 jacked up to lift the tire 5 off the ground. Such adjustment of the felly 3, rim 4 and tire 5 is maintained due to the fact that the worm gear pinions 20 cannot drive the master worm wheel 34. Thus the tread gauge of the tires of such wheels may be varied within a wide range of adjustments and such adjustments may be supplemented by lateral shifting of the rim 4 on the felly 3, in the manner previously described. As will be evident, the felly 3, rim 4 and tire 5 are always adjusted to maintain the same concentric to the hub 1, or, in other words, the axis of rotation.

In the modified embodiment of my invention shown in Figures 7 to 10, the axle 45 rotatably extends through the master worm wheel 46 outwardly of the hub sections 47 and through a pair of circular clutch plates 48, 49 bolted, as at 50, to said hub sections 47 concentrically thereof at the outboard and inboard side of said hub and with axial apertures 51 therein in which said axle 45 is fitted. The clutch plates 48, 49 are keyed to the axle 45, as at 52. Segmental clutch shoes 53 vertically adjustable in recesses 54 in the clutch plates 48, 49 are clampingly engaged with the axle 45 by set screws 54 threaded into said plates 48, 49. The clutch shoes 53 are keyed, as at 55, to said axle 45. Thus the hub sections 47 are secured to the axle 45 to be driven by the axle solely. For adjusting the master worm wheel 46, the same is provided with a hub gear 56 recessed into the clutch plate 48 on the outboard side of the hub and which meshes with a smaller gear 57 rotatable in a recess 58 in said plate on a square end shaft 59 journaled in and extending out of said plate 48 for operation by the described spud wrench 38 which is formed with a socket 60 for fitting the squared end of said shaft. The clutch plate 48 is provided with apertures 61 for registry with sockets 62 in the gear 56, corresponding to the sockets 39 in the master worm wheel 16. The purpose of the apertures 61 and sockets 62 is the same as the sockets 35 and apertures 40. Obviously the described modified embodiment of the invention eliminates attachment of the hub to the brake drum flange, as in the preferred embodiment of the invention, and flanging the axle, as in the preferred embodiment.

The foregoing will, it is believed, suffice to impart a clear understanding of my invention, without further explanation.

Manifestly, the invention, as described, is susceptible of modification without departing from the inventive concept, and right is herein reserved to such modifications as well within the scope of the appended claims.

Having described the invention, what is claimed as new is:

1. In a wheel structure, a hub, a tire retaining rim, and means for adjusting said rim laterally of said hub comprising spokes rotatable in said hub, and means to rotate said spokes in unison.

2. In a wheel structure, a hub, a tire retaining rim, and means for adjusting said rim laterally of said hub comprising spokes rotatable in said hub, and means to rotate said spokes in unison comprising a worm wheel rotatable in said hub and worm gear pinions on said spokes meshing with said worm wheel.

3. In a wheel structure, a hub, a felly having a tire retaining rim thereon, and means for adjusting said felly laterally of said hub to correspondingly adjust a tire retained on said rim comprising spokes rotatable in said hub and having outer end cranks thereon universally connected to said felly, and means for rotating said spokes in unison.

4. In a wheel structure, a hub, a felly, having a tire retaining rim thereon, and means for adjusting said felly laterally of said hub to correspondingly adjust a tire retained on said rim comprising spokes rotatable in said hub and having outer end cranks thereon, ball and socket joint connections between said cranks and felly, and means for rotating said spokes in unison.

5. In a wheel structure, a hub, a felly, having a tire retaining rim thereon, and means for adjusting said felly laterally of said hub to correspondingly adjust a tire retained on said rim comprising spokes rotatable in said hub and having outer end cranks thereon, ball and socket joint connections between said cranks and felly, and means for rotating said spokes in unison, comprising a worm wheel rotatable in said hub, and worm gear pinions on the inner ends of said spokes meshing with said worm wheel.

6. In a wheel structure, a hub, a felly, having a tire retaining rim thereon, and means for adjusting said felly laterally of said hub to correspondingly adjust a tire retained on said rim comprising spokes rotatable in said hub and having outer end cranks thereon, ball and socket joint connections between said cranks and felly, and means for rotating said spokes in unison, comprising a worm wheel rotatable in said hub, and worm gear pinions on the inner ends of said spokes meshing with said worm wheel, said wheel having an exposed hub section provided with an axial socket therein for engaging a spud wrench.

7. In a wheel structure, a hub, a felly having a tire retaining rim thereon, and means for adjusting said felly laterally of said hub to correspondingly adjust a tire retained on said rim comprising spokes rotatable in said hub and having outer end cranks thereon universally connected to said felly, and means for rotating said spokes in unison, and means on said felly and rim for adjusting said rim laterally of said felly to supplement lateral adjustment of said rim by said felly.

ARMOND W. BRAUN.

No references cited.